Figure 1:
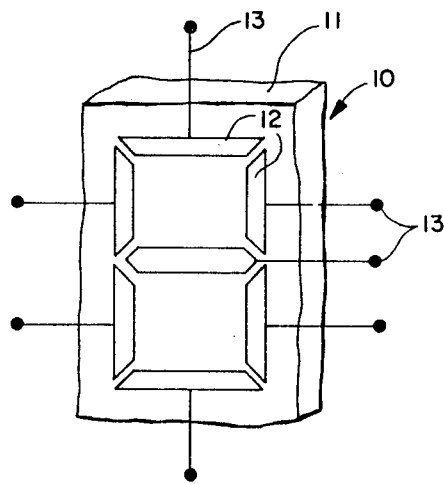

United States Patent
Ritchie

[11] 3,873,186
[45] Mar. 25, 1975

[54] LIQUID CRYSTAL DISPLAY
[75] Inventor: Kim Ritchie, Phoenix, Ariz.
[73] Assignee: Motorola, Inc., Chicago, Ill.
[22] Filed: Sept. 18, 1973
[21] Appl. No.: 398,517

[52] U.S. Cl. ............................. 350/160 LC
[51] Int. Cl. ................................... G02f 1/36
[58] Field of Search ...................... 350/160 LC

[56] References Cited
UNITED STATES PATENTS
3,645,604  2/1972  Ngo ........................ 350/160 LC
3,675,988  7/1972  Soref ....................... 350/160 LC OTHER PUBLICATIONS
Creagh, "Nematic Liquid Crystal Materials for Displays," Proc. IEEE, Vol. 61, No. 7, July 1973, pp. 814–822.

*Primary Examiner*—Edward S. Bauer
*Assistant Examiner*—Matthew W. Koren
*Attorney, Agent, or Firm*—Vincent J. Rauner; Henry T. Olsen

[57] ABSTRACT

A liquid crystal display with an extended temperature range has a pair of serially aligned cells. One of the cells contains a liquid crystal material having a nematic temperature range extending from at least −20°C to 60°C while the liquid crystal material in the other cell has a nematic temperature range from at least 60°C to 100°C so that normal expected temperature ranges are covered. The two cells are defined by first, second and third plates which are secured in spaced parallel relation. The second or intermediate plate is a light transmitting plate which has electrodes on opposite surfaces in contact with each of the liquid crystal materials. The first and third plates have electrodes on only one side forming the second electrode for each of the two cells, one of said plates being reflective and the other transmissive.

6 Claims, 2 Drawing Figures

LIQUID CRYSTAL DISPLAY

BACKGROUND OF THE INVENTION

This invention relates to liquid crystal displays and more particularly to a liquid crystal display having a suitably broad temperature range for use with an electronic wristwatch.

The wristwatch with its precision balance wheel, jeweled bearings, and ability to perform adequately under adverse conditions is rapidly being replaced by an electronic watch. The electronic watch has the ability to be extremely precise, of low cost and maintenance free. At present, several types of electronic watches are being made whose time base is determined by a quartz crystal oscillator. One type of which uses the quartz crystal, a monolithic silicon gate CMOS chip, including the oscillator, binary divider, wave shaper and buffering circuitry, and a small rotary stepping motor. The power drain of the entire circuitry excluding the motor is less than 5 microamps at 1.3 volts. Thus, even with the addition of the motor current, a battery will operate the watch in excess of one year. Some of the present watches are not all electronic. Most of the watches, at present, use the output from the semiconductor chip to drive either a motor or to give synchronizing pulses to a conventional balance wheel. The motor or the balance wheel in turn drive hands which exhibit the time in a conventional manner. However, these outputs being mechanical are still subject to necessary maintenance, and it is desirable to provide an all electronic watch which not only eliminates the mechanical time base generation but also eliminates the mechanical display mechanism.

An all electronic display mechanism for the wristwatch must satisfy severe requirements with respect to power consumption. An average figure for power consumption is on the order of only 10 microwatts for the display. Of all of the possible candidates for an electronic display, only liquid crystals have the present capability of operating on this meager supply of power. Although some effort has been expended in utilizing light emitting diodes, continuous operation of these devices is out of the question, and there is some question as to whether or not a display which must be operated on demand is suitable for all purposes. Thus, it appears that liquid crystal display is the best choice.

There are three types of liquid crystals—cholesteric, smectic, and nematic. At the present time, only the nematic liquid crystal has been applied to displays with any high degree of success. In the nematic structure, all of the molecular axes tend to be parallel. Motion parallel or perpendicular to this preferred direction is possible, but the anisotropic shape of the molecules manifests itself in anisotropic behavior of several macroscopic parameters; in particular, an anisotropic viscosity results with a much lower value parallel to the molecular axes. This crystalline like structure can be made, in practical cases, to be nearly perfect over distances very large as compared to the molecular distances. If the boundary surface is prepared in a proper manner, a uniform alignment may be obtained in thin layers over areas of many square centimeters. Two distinct alignments are possible: a homogeneous alignment can be produced by a unidirectional rubbing of the surface to give a preferred direction for the molecular axis; and a homeotropic alignment can be achieved by presenting a nonwetting surface to the liquid crystal by means of surface cleaning and chemical treatment.

The smectic and cholesteric mesophases have their own particular characteristic structures which result in some unusual physical and optical effects, but at present it has not been feasible to utilize these materials in a practical display.

The multifarious properties of the nematic structure allow a large number of distinct operating modes for displays. The nematic structure is a nonsymmetrical shaped molecule and numerous anisotropies exist in macroscopic parameters. These may, for simplicity, be described by a parallel and a perpendicular component of the particular parameter. The most important of these parameters for displays is the index of refraction. Materials with an index of refraction which varies with direction are termed birefringent and have the ability to change the polarization state of a light wave. This ability to change the direction of a light wave is used in the most common mode of operation termed dynamic scattering. With dynamic scattering the display effect results from the interaction of charge flow in the liquid crystal medium which disrupts the otherwise aligned molecules causing a spatial variation of the direction of the optical axes. This means that different portions of the wave front will be altered in direction in a random manner resulting in a scattering of the light. This scattering (mostly in the forward direction, although multiple scattering can cause backscattered light) results in an easily seen effect since if the light source is not visible in the display, all unactivated areas will appear black while the scattering areas will appear bright and therefore will yield a substantial contrast. The light source for the reflective mode can be the ambient light itself and therefore no power is required for the light energy. Since this low power consumption is essential for watch operation, only the reflective mode is presently considered feasible for watch displays in ambient light condition. The power consumption for a display of this type is very small even though some current flow is required. Current densities of less than $1 mA/cm^2$ have good display characteristics for displays operating at approximately 15 V. While operation is possible at less than 15 V, the response is sluggish.

Another mode of operation which is utilized to alter the state of polarization is called "Distortion of Aligned Phases". In this mode, light which has been polarized by a top surface polarizing film passes unaffected through regions of the homeotropically aligned liquid crystal since only one phase is encountered. This light then is absorbed by the second polarizer giving all unactivated areas a black appearance. If the liquid crystal has a "negative dielectric anisotropy", then under the influence of an electric field all bulk molecules will attempt to align incomplete due to charge transfer disruptions which may be caused by dynamic scattering or due to a time variation arising from the use of an alternating current drive will cause the light to pass through a birefringent medium resulting in random polarization upon entering the second polarizer. Thus a good portion of the light will be passed by the second polarizer. This light is reflected, and after another traversal of the cell escapes, causing the activated region to appear bright and giving the desired contrast effect. If, by correct choice of liquid crystals and proper surface alignment, the liquid crystal can be made to align in a particular direction relative to the polarizers under the action of the field, then an exact 90 degree rotation will occur for a particular wavelength and thickness. This will allow for some color effects.

Two features are important for the distortion of aligned phases mode of operation. First, no current flow is required, and the expected life of the cell is higher. Second, since the contrast is obtained by the polarizing film, a perfect reflector is not required as in the dynamic scattering mode. This overcomes one of the objections to the reflective dynamic scattering device. If the light source is reflected toward the viewer, besides being annoying, the display is washed out. A diffused reflector for the distortion of aligned phases mode will assure that this will not happen.

Another mode or structure of operation is possible which utilizes a remarkable property of liquid crystals which occurs in specially constructed cells of homogeneously aligned liquid crystals. This property is the result of achieving a very specific optical activity simply by the details of the construction process. Optical activity refers to the ability to rotate the plane of polarization of light without affecting the type of polarization. This property is common among birefringent materials but is usually a function of thickness and wavelength. The effect in liquid crystals is a form of twisted nematic structure. A cell is constructed by obtaining homogeneous alignment on the two boundary surfaces of the liquid crystal with the preferred directions of the surface as being orthogonal. Polarized light incident on this cell with the plane of vibration aligned with preferred direction of the first surface will independent of the wavelength and thickness undergo rotation of 90° in traversing the cell. If any angle other than 90° had been built into the structure, the vibration plane would be rotated by that angle. Thus, a pair of parallel polarizers will absorb all light in the unactivated regions because of the 90° rotation of light by the twisted structure. In an activated region, if the liquid crystal has a positive dielectric anisotropy, then all bulk molecules tend to align parallel with the field. In this condition, only one phase is experienced by the light and, consequently, no rotation or change of the state of polarization is experienced. Only parallel polarizers are encountered by the light and it may be reflected from the cell yielding the desired display function. This type of cell also has the advantages of the distortion of aligned phases mode in that possibly longer life may result and a diffuse reflector may be utilized.

Another mode of operation of liquid crystal displays is the quest-host mode. In this type of operation, a homeotropically aligned liquid crystal has included in its structure a dye whose absorption characteristics depend on its orientation relative to the propagation direction of a light wave. By activating the cell, the liquid crystal has a more negative dielectric anisotropy then the liquid crystal and its quest dye molecules are aligned perpendicular to the field resulting in an absorption change giving the desired contrast effect.

All of the known modes have their advantages and disadvantages. The dynamic scattering mode needs current flow and can be washed out for certain viewing angles. However its package and structure are the simplest. The distortion of alignment phases and twisted modes usually require less current flow, lower operating temperatures and can't be washed out. On the other hand, the packaging is more expensive and their effectiveness suffers on high angle viewing. Since they absorb light, they can heat up. The guest-host mode can easily give color effects, but the effects aren't strong and potential problems of chemical compatibility between the liquid crystal and the dye may affect life. However, with any liquid crystal type of operation, the temperature range is relatively restricted with known materials.

SUMMARY OF THE INVENTION

Ordinary outdoor ambient temperatures range from approximately a −20°C to a +50°C. Thus, if a liquid crystal display is to be properly utilizable for an electronic wristwatch it must exhibit a nematic characteristic range covering at least this range of temperatures. It is, therefore, the primary object of this invention to provide a liquid crystal display which is operative under ordinary ambient temperature conditions.

A further object of the invention is to provide an improved liquid crystal display operative from −20°C to 100°C.

In accordance with the foregoing objects there is provided a liquid crystal display comprising means securing first, second and third light transmitting plates in spaced parallel relation, said second light transmitting plate having transparent electrodes on opposite surfaces, said first and third light transmitting plates having electrodes thereon in parallel opposed relation to the electrodes on said second plate. The first, second and third plates together define first and second cells, said first cell being filled with a liquid crystal material having a first nematic temperature range from, for example, 0°C to 50°C and second cell being filled with a liquid crystal material having a nematic characteristic in a second temperature range, for example, 50°C to 100°C. Thus, the temperature range of the first and second cells extend over normal ambient temperature ranges.

THE DRAWINGS

Figure 2:
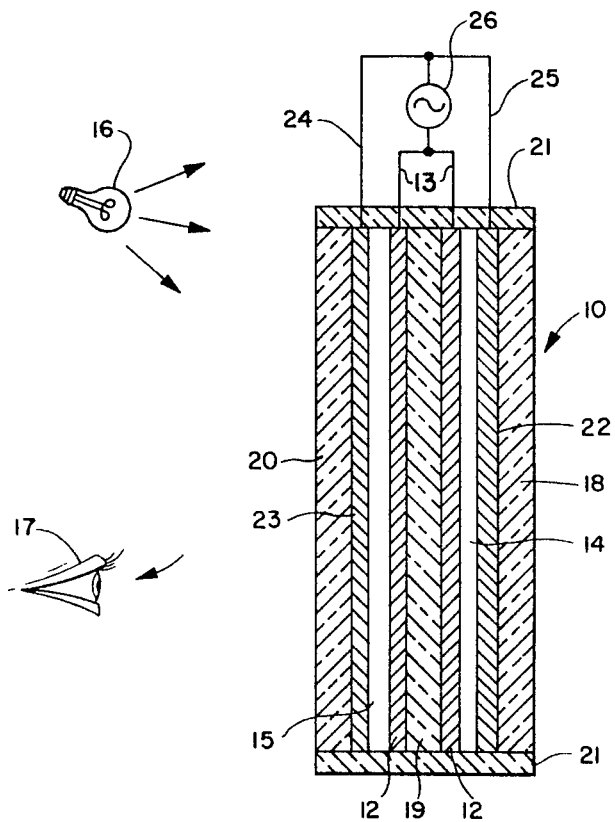

Further objects and advantages of the invention will be understood from the following complete description thereof and from the drawings wherein:

FIG. 1 is a perspective view of a liquid crystal display in accordance with the preferred embodiment thereof; and FIG. 2 is a vertical cross section thereof.

COMPLETE DESCRIPTION

As shown in FIG. 1, the liquid crystal display 10 comprises a housing 11 and a plurality of arranged configured electrodes 12 contained therein. Suitable electric leads 13 extend outwardly from the package to activate the electrodes 12 as desired to effect contrast in the liquid crystal display. Since the electrodes 12 are of transparent material, they are shown depicted as if in an activated condition thereby rendering opaque the liquid crystal material in the cell. The electrodes are arranged in a conventional 7 segment alphanumeric configuration so that when all segments are activated, a figure eight is depicted. It will be appreciated that any larger number of segments may be utilized to improve the clarity of the display while increasing the number of terminals 13 extending therefrom. It will be further noted that the electrodes need not be in a bar segment arrangement as shown but may be in a X-Y scanning type matrix for activating the liquid crystal material.

As shown in FIG. 2, the liquid crystal display 10 includes two cells 14 and 15 arranged in series with a light source 16 for viewing by reflection from point 17. Since the light source may be merely sunlight, it will be appreciated that the light source 16 is not a part of the inventive combination but is merely included for purpose of illustration.

The cells 14 and 15 are defined between first, second and third plates 18 to 20 inclusive together with end and side closing members 21. The second or intermediate light transmitting plate 19 has the configured conductive electrodes 12 on either side thereof so as to be in electrical continuity with the cells 14 and 15. The inner surfaces facing the cells 14 and 15 of parallel plates 18 and 20 have conductive electrodes 22 and 23 respectively thereon so as to be in electrical continuity with the liquid crystal mixture contained in the respective cells. Terminals 24 and 25 extend from the respective cells 14 and 15 to make electrical contact with the electrodes 22 and 23. These terminals together with the terminal 13, a pair of which is shown in FIG. 2, are connected across a suitable power source 26 to provide electrical control of the opacity of the liquid crystal mixture contained in each of the cells. Since the display is to be front lighted for reflection viewing, one of the conductive layers 22 is of a suitably reflecting conductive material such as aluminum which may be readily vapor deposited on plate 18. The other electrodes 12 and 23 are of conductive transparent films of tin oxide or gold.

The two serially arranged cells 14 and 15 are filled with liquid crystal materials having different nematic characteristic temperature ranges so that the overall temperature range of the display is extended from −20°C to approximately 100°C. The cell 14 has a liquid crystal material with a nematic range of approximately 50°C to 100°C while the cell 15 has a liquid crystal material having a lower nematic temperature range. Since the normal characteristic of a liquid crystal with respect to temperature is to be at a crystalline solid at a low temperature range, a nematic range at an intermediate temperature range, and an isotropic transparent liquid at a higher temperature range, the material in cell 14 may be an isotropic solid while the cell 15 is operating in a nematic mode. At higher temperatures, the liquid crystal material in the cell 15 will be an isotropic transparent liquid while the material in the cell 14 is operating in the nematic range. The configured electrodes 12 are placed on either side of the intermediate support plate 19 so that the electrodes may be readily aligned with each other. Thus, at a central temperature range where both cells 14 and 15 are operating in the nematic range, the information to be displayed will be aligned with each other and readily read. By way of specific example, the liquid crystal in cell 15 may be a mixture of N-(p-methoxybenzylidene)-4-butylaniline (MBBA) having a structural formula as follows:

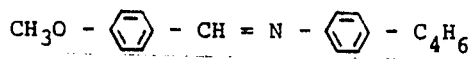

and N-(p-hexyloxybenzylidene)-4-pentylaniline (HBPA) having a structural formula:

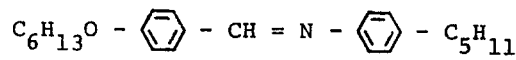

This mixture has a nematic temperature characteristic of −37°C to 62°C.

For the higher temperature range material in cell 14, a useful material is (p-hexyloxybenzylidene)-4-methylcarbonatoaniline (HBMCA) which has a structural formula:

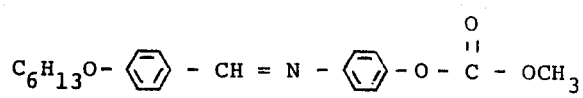

and a temperature characteristic of 62°C to approximately 102°C. The two cells thus provide in a single display, nematic liquid crystal behavior in the temperature range between −37°C and 102°C.

It will thus be seen that there is provided a display having a broad temperature range covering most ambient temperature conditions which is useful for many purposes including an electronic watch display. While the invention has been disclosed by way of the preferred embodiment thereof, it will be recognized that suitable modification may be made therein without departing from the spirit and scope of the invention.

I claim:

1. A liquid crystal display comprising first, second and third plates, each having front and rear surfaces, first spacer means separating the front surface of said first plate from the rear surface of said second plate and forming a chamber for a first type of liquid crystal material, second spacer means separating the front surface of said second plate from the rear surface of said third plate and forming a second cell for a second type of liquid crystal material, shaped light transmitting electrodes on the surfaces of said second plate within each of said cells for selectively applying electric field across said liquid crystal material, a pair of oppositely disposed electrodes in each of said cells on said first and third plates, the liquid crystal material in the first of said cells having a nematic temperature range of approximately −20°C to 60°C and the liquid crystal material arranged in said second cell being of a type having a nematic range of approximately 60°C to 100°C whereby the temperature range of the display is extended to cover broad range temperature conditions.

2. A liquid crystal display as recited in claim 1 wherein said material in the first cell is a mixture of N-(p-methoxybenzylidene)-4-butylaniline (MBBA) and N-(p-hexyloxybenzylidene)-4-pentylaniline (HBPA) and the material in the second cell is (P-hexyloxybenzylidene)-4-methylcarbonatoaniline (HBMCA).

3. A liquid crystal display comprising means securing a first, second and third plate in spaced parallel relation, said second plate being of light transmitting material having transparent electrodes on opposite surfaces, said first plate being of transparent material and having a transparent electrode thereon in spaced parallel opposed relation to one of the electrodes on said second plate, said third plate having an electrode thereon of reflective conductive material, said first, second and third plates together defining first and second cells, said first cell being filled with a liquid crystal material having a first low nematic temperature range of approximately −20°C to 60°C and the second cell being filled with a liquid crystal material having a nematic characteristic in a second higher temperature range of approximately 60°C to 100°C thereby extending the temperature range of the display over normal temperature conditions.

4. A liquid crystal display as recited in claim 3 wherein said material in the first cell is a mixture of N-(p-methoxybenzylidene-4-butylaniline (MEBA) and N-(p-hexyloxybenzylidene)-4-pentylaniline (HBPA) and the material in the second cell is (p-hexyloxybenzylidene)-4-methylcarbonatoaniline (HBMCA).

5. A liquid crystal display with an extended temperature range comprising a pair of serially aligned cells, one of said cells containing a liquid crystal material having a first low nematic temperature range of approximately −20°C to 60°C and the other of said cells containing a liquid crystal material having a high nematic temperature range of approximately 60°C to 100°C, said cells being defined by first, second and third plates secured together in spaced parallel relation, the second plate being a light transmitting plate having electrodes on opposite surfaces in contact with each of the liquid crystal materials, the first and third plates having electrodes on only one side in opposed relation to the electrodes on said second plate, the electrode of one of said first and third plates being of reflective material, while the electrode of the other of said first and third plates is of light transmitting material.

6. A liquid crystal display as recited in claim 5 wherein said material in the first cell is a mixture of N-(p-methoxybenzylidene)-4-butylaniline (MBBA) and N-(p-hexyloxybenzylidene)-4-pentylaniline (HBPA) and the material in the second cell is (p-hexyloxybenzylidene)-4-methylcarbonatoaniline HBMCA).

* * * * *